US010215862B2

(12) United States Patent
Syrstad et al.

(10) Patent No.: US 10,215,862 B2
(45) Date of Patent: Feb. 26, 2019

(54) SYSTEMS AND METHODS FOR A CODE CARRIER DIVERGENCE HIGH-PASS FILTER MONITOR

(71) Applicant: Honeywell International Inc., Morristown, NJ (US)

(72) Inventors: Justin Joseph Syrstad, Brooklyn Park, MN (US); Mats Anders Brenner, Plymouth, MN (US); John M. Howard, St. Paul, MN (US); Kim A. Class, Andover, MN (US); Bruce G. Johnson, Shoreview, MN (US); Randy J. Reuter, Brooklyn Park, MN (US)

(73) Assignee: Honeywell International Inc., Morris Plains, NJ (US)

( * ) Notice: Subject to any disclaimer, the term of this patent is extended or adjusted under 35 U.S.C. 154(b) by 719 days.

(21) Appl. No.: 14/247,037

(22) Filed: Apr. 7, 2014

(65) Prior Publication Data
US 2015/0285916 A1    Oct. 8, 2015

(51) Int. Cl.
*G01S 19/03*    (2010.01)
*G01S 19/08*    (2010.01)

(52) U.S. Cl.
CPC .............. *G01S 19/03* (2013.01); *G01S 19/08* (2013.01)

(58) Field of Classification Search
CPC ........ G01S 19/03; G01S 19/08; G01S 5/0009; G01S 5/009; G01S 5/0036; G01S 19/43;
(Continued)

(56) References Cited

U.S. PATENT DOCUMENTS 5,548,293 A * 8/1996 Cohen .................. G01S 5/0009
342/352
5,600,329 A * 2/1997 Brenner ................. G01S 5/009
340/979
(Continued)

FOREIGN PATENT DOCUMENTS

WO        9829755        7/1998
WO    WO-9829755 A1 *  7/1998    ............. G01S 19/22
(Continued)

OTHER PUBLICATIONS

Simili et al., "Code-Carrier Divergence Monitoring for the GPS Local Area Augmentation System", "IEEE/ION Position, Location, and Navigation Symposium", 2006, pp. 483-493.*
(Continued)

*Primary Examiner* — Bernarr E Gregory
*Assistant Examiner* — Nuzhat Pervin
(74) *Attorney, Agent, or Firm* — Fogg & Powers LLC

(57) ABSTRACT

Systems and methods for a code carrier divergence (CCD) high-pass filter monitor are provided. In one embodiment, a signal deformation monitor for a GNSS ground based augmentation station, the monitor comprising: a CCD monitor stage communicatively coupled to a plurality of GNSS reference receivers, wherein the CCD monitor stage inputs raw pseudorange code measurements and accumulated delta range carrier measurements from each of the plurality of GNSS reference receivers; and a Code Carrier Divergence -High Pass Filer (CCD-HPF) monitor stage communicatively coupled to the CCD monitor stage, wherein the CCD-HPF monitor processes each of a plurality of low-pass filtered divergence rate measurements, $d_2$ produced by the CCD monitor stage through a high-pass filter to calculate an averaged CCD-HPF monitor divergence rate, $d_{3\_Average}$; wherein the signal deformation monitor outputs an exclusion signal associated with a GNSS satellite when the averaged
(Continued)

CCD-HPF monitor divergence rate, $d_{3\_Average}$ exceeds an exclusion threshold.

20 Claims, 6 Drawing Sheets

(58) Field of Classification Search
CPC .......... G01S 19/05; G01S 19/02; G01S 19/15; G01S 19/44; G01S 19/30; G01S 19/07; G01S 19/04; G01S 19/47; G01S 19/428; G01S 19/22
USPC ...................................................... 342/357.4
See application file for complete search history.

(56) References Cited

U.S. PATENT DOCUMENTS

| | | | | |
|---|---|---|---|---|
| 6,182,011 B1* | 1/2001 | Ward | ............... | G01S 5/0036 342/357.27 |
| 6,198,430 B1* | 3/2001 | Hwang | ............... | G01S 5/009 342/357.27 |
| 6,266,009 B1* | 7/2001 | Hwang | ............... | G01S 19/32 342/357.27 |
| 6,429,808 B1* | 8/2002 | King | ............... | G01S 19/05 342/357.44 |
| 6,667,713 B2* | 12/2003 | Green | ............... | G01S 19/02 342/357.31 |
| 6,987,820 B1* | 1/2006 | Brenner | ............... | G01S 19/22 375/343 |
| 7,570,204 B1* | 8/2009 | McGraw | ............... | G01S 19/32 342/357.27 |
| 8,085,196 B2* | 12/2011 | Whitehead | ............... | G01S 19/07 342/357.23 |
| 8,311,728 B2* | 11/2012 | Coatantiec | ............... | G01S 19/47 701/472 |
| 9,329,274 B2* | 5/2016 | Schipper | ............... | G01S 19/428 |
| 2003/0040852 A1* | 2/2003 | Green | ............... | G01S 19/02 701/13 |
| 2004/0088111 A1* | 5/2004 | Ahlbrecht | ............... | G01S 5/0009 701/471 |
| 2004/0189518 A1* | 9/2004 | Brenner | ............... | G01S 19/15 342/358 |
| 2005/0203702 A1* | 9/2005 | Sharpe | ............... | G01S 19/32 701/469 |
| 2005/0219119 A1* | 10/2005 | Hsu | ............... | G01S 19/02 342/357.41 |
| 2006/0214844 A1* | 9/2006 | Fagan | ............... | G01S 19/07 342/357.21 |
| 2008/0129586 A1* | 6/2008 | Martin | ............... | G01S 19/47 342/357.25 |
| 2010/0033370 A1* | 2/2010 | Lopez | ............... | G01S 19/08 342/357.29 |
| 2011/0313302 A1 | 12/2011 | Bjorling et al. | | |
| 2012/0154214 A1* | 6/2012 | Leandro | ............... | G01S 19/04 342/357.27 |
| 2015/0015437 A1* | 1/2015 | Schipper | ............... | G01S 19/428 342/357.61 |

FOREIGN PATENT DOCUMENTS

| | | |
|---|---|---|
| WO | 0070354 | 11/2000 |
| WO | 2009125011 | 10/2009 |

OTHER PUBLICATIONS

Simili et al., "Code-Carrier Divergence Monitoring for the GPS Local Area Augmentation System", "IEEE/ION Position, Location and Navigation Symposium", 2006, pp. 483-493 (Year: 2006).*
European Patent Office, "Extended European Search Report from EP Application No. 15160651.4 dated Aug. 5, 2015", "from Foreing Counterpart of U.S. Appl. No. 14/247,037", dated Aug. 5, 2015, pp. 19, Published in: EP.
Murphy et al., "More Ionoshphere Anomaly Mitigation Considerations for Category II/III GBAS", "GNSS 2007—Proceedings of the 20th International Technical Meeting of the Satellite Division of the Institute of Navigation", Sep. 28, 2007, pp. 438-452, Publisher: The Institute of Navigation, Published in: US.
Schipper et al., "Multipath Detection and Mitigation Leveraging the Growing GNSS Constellation", "2014 IEEE/ION Position, Location and Navigation Symposium", May 4, 2014, pp. 833-838, Publisher: IEEE, Published in: US.
Soddu et al., "INMARSAT-4 First L1/L5 Satellite: Preparing for SBAS L5 Services", "Proceedings of the 18th International Technical Meeting of the Satellite Division of the Institute of Navigation", Sep. 16, 2005, pp. 2304-2315, Publisher: The Institute of Navigation, Published in: US.
Van Dierendonck et al., "Measuring Ionospheric Scintillation Effects From GPS Signals", "Proceedings of the 57th Annual Meeting of the Institute of Navigation", Jun. 13, 2001, pp. 391-396, Publisher: The Institute of Navigation, Published in: US.
Van Dierendonck et al., "Next Generation Satellite Based Augmentation System (SBAS) Signal Specification", Jan. 26, 2005, pp. 371-384, Publisher: ION NTM 2005, Published in: US.
Yun et al., "Automated Determiniation of Fault Detection Thresholds for Integrity Monitoring Algorithms of GNSS Augmentation Systems", "Proceedings of IEEE/ION Plans 2012", Apr. 26, 2012, pp. 1141-1148, Publisher: The Institute of Navigation, Published in: US.
Simili et al., "Code-Carrier Divergence Monitoring for the GPS Local Area Augmentation System", "IEEE/ION Position, Location, and Navigation Symposium 2006", 2006, pp. 483-493.
European Patent Office, "Communication pursuant to Article 94(3) from EP Application No. 15160651.4 dated Jul. 20, 2018", from Foreign Counterpart to U.S. Appl. No. 14/247,037, filed Jul. 20, 2018, pp. 1-4, Published: EP.

* cited by examiner

SYSTEMS AND METHODS FOR A CODE CARRIER DIVERGENCE HIGH-PASS FILTER MONITOR

BACKGROUND

Satellite signal deformation can be caused by a satellite fault or a natural satellite bias. This can deform the signal's correlation peak which will result in different range measurements for different receiver designs (filtering and correlation processes). Hence, signal deformation introduces errors that cannot be canceled by differential GPS operation when the ground and airborne receivers are of different designs. Signal deformation monitors (SDM) are designed to detect such a deformation and discontinue use of a satellite's measurement data before the satellite fault impact increases the integrity risk to the airborne user to an unacceptable level. Some implementations of Signal Deformation Monitors utilize a Code Carrier Divergence (CCD) monitor. Such monitors are effective in detecting some instantaneous changes, particularly for signal deformation faults where the SDM detection may exceed time-to-alert requirements. Fault detection performance of the signal deformation and CCD monitors may be established by comparing residual range errors to time-varying maximum allowable range errors.

One problem, which is particularly prevalent near equatorial regions, is that a false SDM alarm can be triggered even when no real fault is present. When this occurs, it is frequently caused by ionospheric activity. As such, the problem of false SDM alerts is frequently encountered near equatorial regions where the ionosphere is significantly more active.

For the reasons stated above and for other reasons stated below, which will become apparent to those skilled in the art upon reading and understanding the specification, there is a need in the art for systems and methods for differentiating actual satellite fault events from false SDM alarms caused by ionospheric activity.

SUMMARY

The Embodiments of the present invention provide methods and systems for differentiating actual satellite fault events from false SDM alarms and will be understood by reading and studying the following specification.

Systems and methods for a code carrier divergence (CCD) high-pass filter monitor are provided. In one embodiment, a signal deformation monitor for a GNSS ground based augmentation station, the monitor comprising: a CCD monitor stage communicatively coupled to a plurality of GNSS reference receivers, wherein the CCD monitor stage inputs raw pseudorange code measurements and accumulated delta range carrier measurements from each of the plurality of GNSS reference receivers; and a Code Carrier Divergence-High Pass Filer (CCD-HPF) monitor stage communicatively coupled to the CCD monitor stage, wherein the CCD-HPF monitor processes each of a plurality of low-pass filtered divergence rate measurements, $d_2$ produced by the CCD monitor stage through a high-pass filter to calculate an averaged CCD-HPF monitor divergence rate, $d_{3\_Average}$; wherein the signal deformation monitor outputs an exclusion signal associated with a GNSS satellite when the averaged CCD-HPF monitor divergence rate, $d_{3\_Average}$ exceeds an exclusion threshold.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

Figure 1:
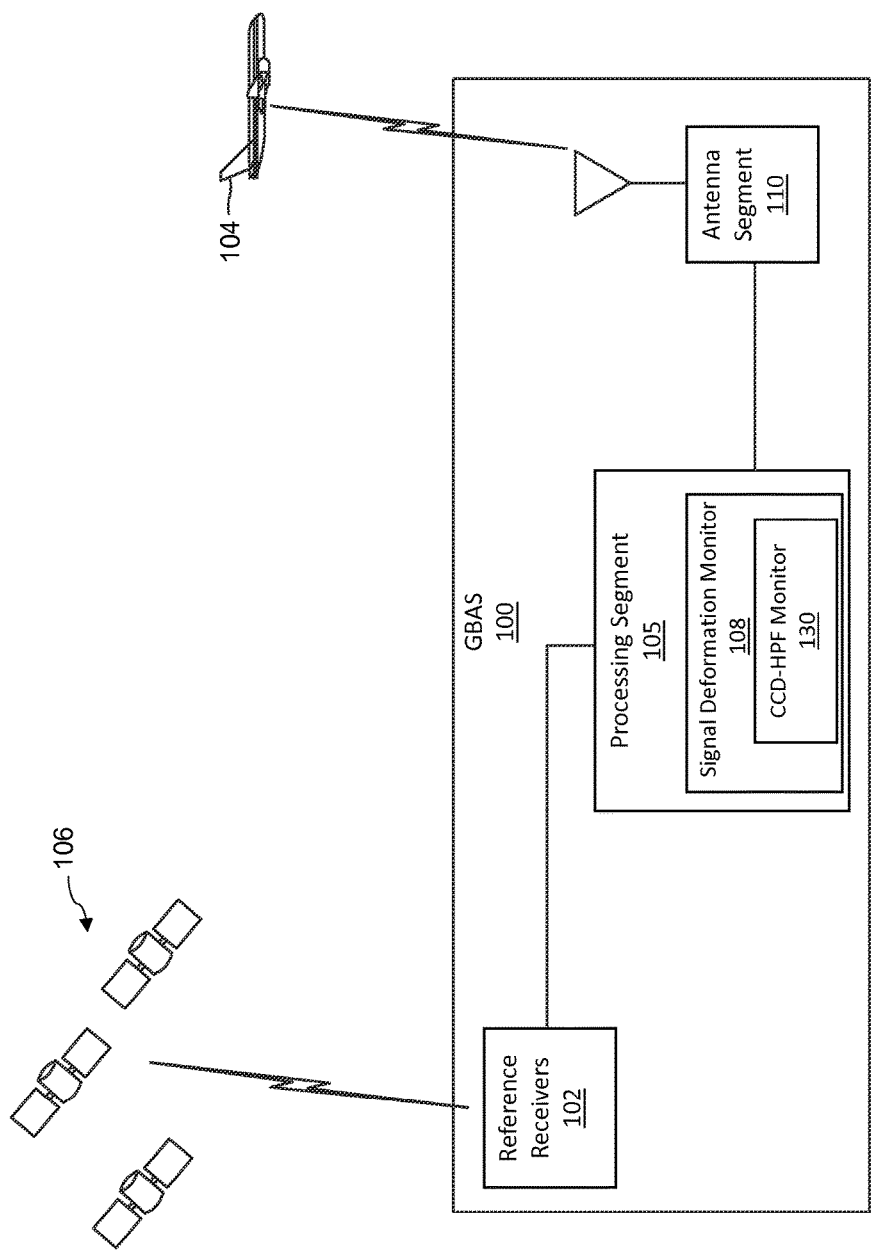
FIG. 1 is a diagram illustrating a Ground Based Augmentation System (GBAS) of one embodiment of the present disclosure.

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present disclosure address signal deformation as a threat fault. Existing signal deformation monitoring systems do exists that perform signal deformation monitoring. However, there is a transient part of the threat space that these signal deformation monitors do not mitigate, which is exasperated where ionospheric activity is more severe, such as in equatorial regions. Ionospheric activity creates noise which makes it difficult for signal deformation monitors to identify satellite faults because that noise becomes superimposed on the satellite signal. As a result, the transient response caused by the ionospheric activity can be misinterpreted as being symptomatic of a satellite fault that the signal deformation monitor is required to detect. Embodiments of the present invention provide systems and methods for detecting and mitigating false signal deformation monitor alarms by introducing at GBAS ground stations new code-carrier divergence (CCD) monitor designs for detecting transient signal deformation faults.

A CCD threat is based on the potential of a satellite fault that causes divergence of the code and carrier such that the impact of the divergence would generate unbounded pseudorange corrections. One method for addressing code carrier divergence is the implementation of a real-time CCD monitor in the ground facility to calculate the divergence rate estimate and detect the satellite CCD fault. For example, the CCD Monitor calculates raw code minus carrier values by subtracting the current accumulated phase from the current pseudo range for each satellite measurement. The divergence rate measurements that are calculated as a function of those raw code minus carrier values are filtered, the divergent rate measurements for common satellites are averaged across all reference receivers, and the resulting divergence rate estimate is compared to a detection threshold. A ranging source (RS) with a divergence rate estimate exceeding the CCD detection threshold is excluded from the broadcast set while it continues to be monitored. An excluded RS is eligible for readmittance when the divergence rate estimate drops below the readmittance threshold at the re-admittance time interval.

As will be explained in greater detail below, in addition to processing raw code and carrier measurements using a low pass filter, to overcome challenging atmospheric activity, embodiments described herein add a high pass filter (HPF) to the processing. For example, a CCD monitor's discriminator can be further filtered using a second order, high-pass Butterworth filter with a 0.01 Hz cutoff frequency. The output of this HPF is used to detect transient signal deformation faults that are not otherwise protected by the signal deformation monitor. That is, the high pass filtering functions to screen out the relatively slow environmental changes, thus allowing fast transient signal deformation faults to be exposed and detected. As a result, embodiments disclosed herein provide ways to detect transient signal deformations in the equatorial region, which also work in locations all around the world.

FIG. 1 is a block diagram illustrating an example ground based augmentation system (GBAS) 100 of one embodiment of the present disclosure. GBAS 100 is a system that receives and measures signals from Global Navigation Satellite System (GNSS) satellites 106 and broadcasts data to aircraft 104. For example, in different embodiments, the GNSS satellites 106 may comprise satellites forming part of the Global Positioning System (GPS), the GLONASS system, the Galileo system, the Compass positioning system, or the like. GBAS 100 includes a processing segment 105 that provides pseudorange correction and approach guidance to an aircraft 104. To provide the pseudorange corrections and approach guidance, the processing segment 105 receives and processes GNSS signals received by multiple reference receivers 102 that have accurately known reference points and communicate with GNSS satellites 106. Further, the processing segment 105 generates pseudorange corrections measurements and monitors for threats to the integrity of the pseudorange corrections. The processing segment 105 also provides the flight path information and dynamic pseudorange corrections to an antenna segment 110 for transmission to aircraft 104. When the processing segment 105 receives and processes GNSS signals, the GBAS 100 receives the GNSS signals through the reference receivers 102. The GBAS 100 calculates the pseudorange corrections and stores approach data using processing segment 105, then transmits the corrections and approach data to the aircraft 104 through the antenna segment 110. Processing segment 105 further comprises a Signal Deformation Monitor 108 which, as explain below, comprises one embodiment of a code-carrier divergence (CCD)-high-pass filter (HPF) monitor 130 for distinguishing actual satellite faults from ionospheric noise.

Figure 1A:
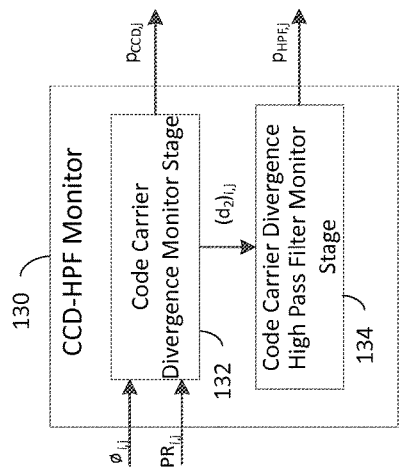
FIG. 1A is a diagram illustrating a CCD-HPF monitor of one embodiment of the present disclosure.

The CCD-HPF monitor 130 is actually comprised of two monitor stages as illustrated in FIG. 1A. The first monitor stage (shown at 132) may be a traditional CCD monitor which may comprise two sequential first order filters. This stage is simply referred to as the CCD monitor stage 132 throughout this disclosure. The second monitor stage (shown at 134) builds off the filtering of the CCD monitor stage 132 by filtering a CCD monitor stage divergence rate estimate (indicated by $d_2$) with a high-pass filter, such as a second order, high-pass Butterworth filter. This latter monitor stage is referred to as the CCD-HPF monitor stage 134, or just HPF 134. The CCD monitor stage 132 is used to detect CCD faults and outputs a $P_{CCD,j}$ monitor status flag whose status indicates when an individual satellite (which identified herein by the index "j") of GNSS satellites 106 has a CCD fault detected. The CCD-HPF monitor stage 134 is used to detect transient signal deformation faults and outputs a $P_{HPF,j}$ monitor status flag whose status indicates when a satellite (j) should be excluded from the pseudorange correction calculation data transmitted to aircraft 104 by the GBAS 100. As mentioned above, CCD-HPF monitor 130 inputs raw pseudorange measurements, $PR_{i,j}$, and accumulated delta range carrier measurements, $\o_{i,j}$, for reference receiver "i" of the reference receivers 102 and individual satellite "j" of the GNSS satellites 106.

Figure 2:
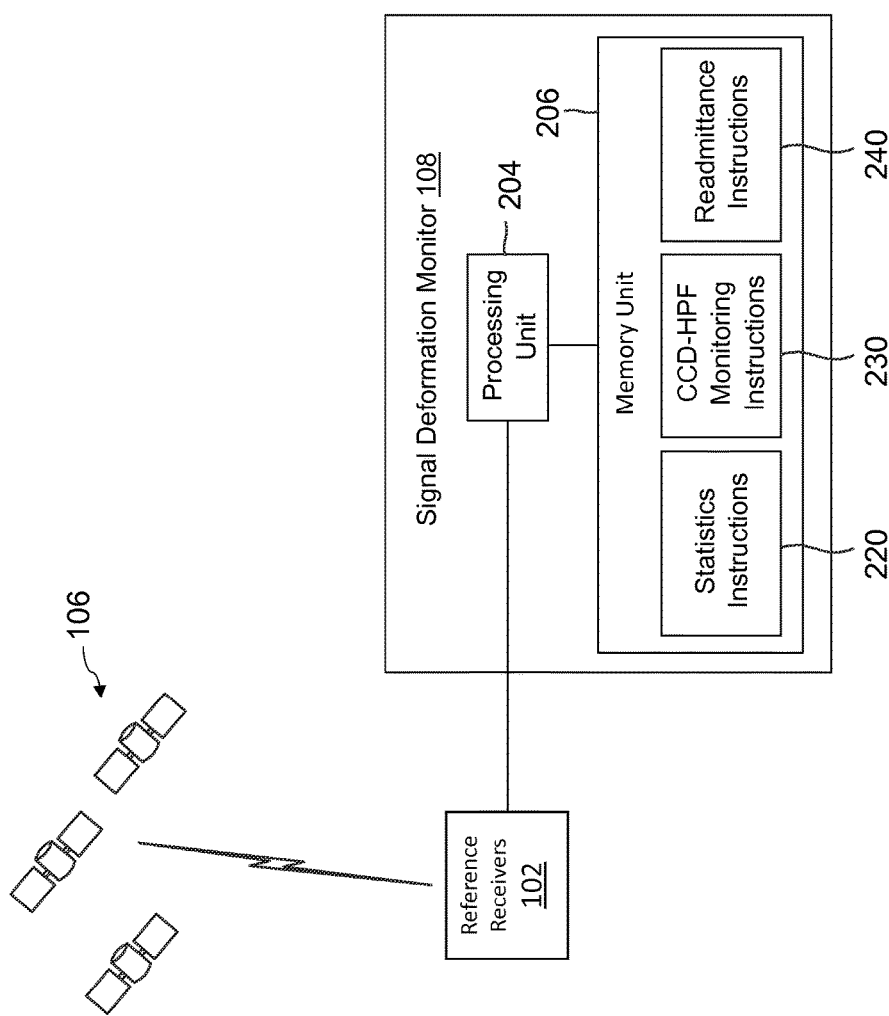
FIG. 2 is a diagram illustrating a signal deformation monitor of one embodiment of the present disclosure.

FIG. 2 is a block diagram further illustrating an example embodiment of Signal Deformation Monitor 108. Signal Deformation Monitor 108 is coupled to one or more of the GNSS reference receivers 102. The phrase "reference receiver" as used herein refers to a receiver, located at an accurately known reference point, which receives signals from at least one of the GNSS satellite 106 through an antenna and prepares the signal for further processing by Signal Deformation Monitor 108 (as well as other processing systems in GBAS 100). In particular, Signal Deformation Monitor 108 receives the raw pseudorange code $PR_{i,j}$ and uncorrelated accumulated delta range carrier $\o_{i,j}$ data for each of the reference receivers 102 for a particular GNSS satellite 106.

In at least one embodiment, Signal Deformation Monitor 108 includes a processing unit 204 and a memory unit 206. For example, processing unit 204 may be a programmable device that processes signals received from the GNSS reference receivers 102 as instructed by instructions stored on the memory unit 206. In one embodiment, memory unit 206 stores the executable instructions and data for implementing elements of the CCD-HPF monitor 130 described herein. For example, the memory unit 206 is shown as comprising statistics instructions 220, CCD-HPF Monitoring Instructions 230 and Re-admittance Instructions 240.

For some embodiments, the memory unit 206 is an electronic hardware device for storing machine readable data and instructions. In one embodiment, memory unit 206 stores information on any appropriate non-transient computer readable medium used for storage of computer readable instructions or data structures. The computer readable medium can be implemented as any available media that can be accessed by a general purpose or special purpose computer or processor, or any programmable logic device. Suitable processor-readable media may include storage or memory media such as magnetic or optical media. For example, storage or memory media may include conventional hard disks, Compact Disk-Read Only Memory (CD-ROM), volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), Static RAM (SRAM), etc.), Read Only Memory (ROM), Electrically Erasable Programmable ROM (EEPROM), Ferroelectric RAM (FRAM), and flash memory, etc. Suitable processor-readable media may also include transmission media such as electrical, electromagnetic, or digital signals, conveyed via a communication medium such as a network and/or a wireless link.

Figure 3:
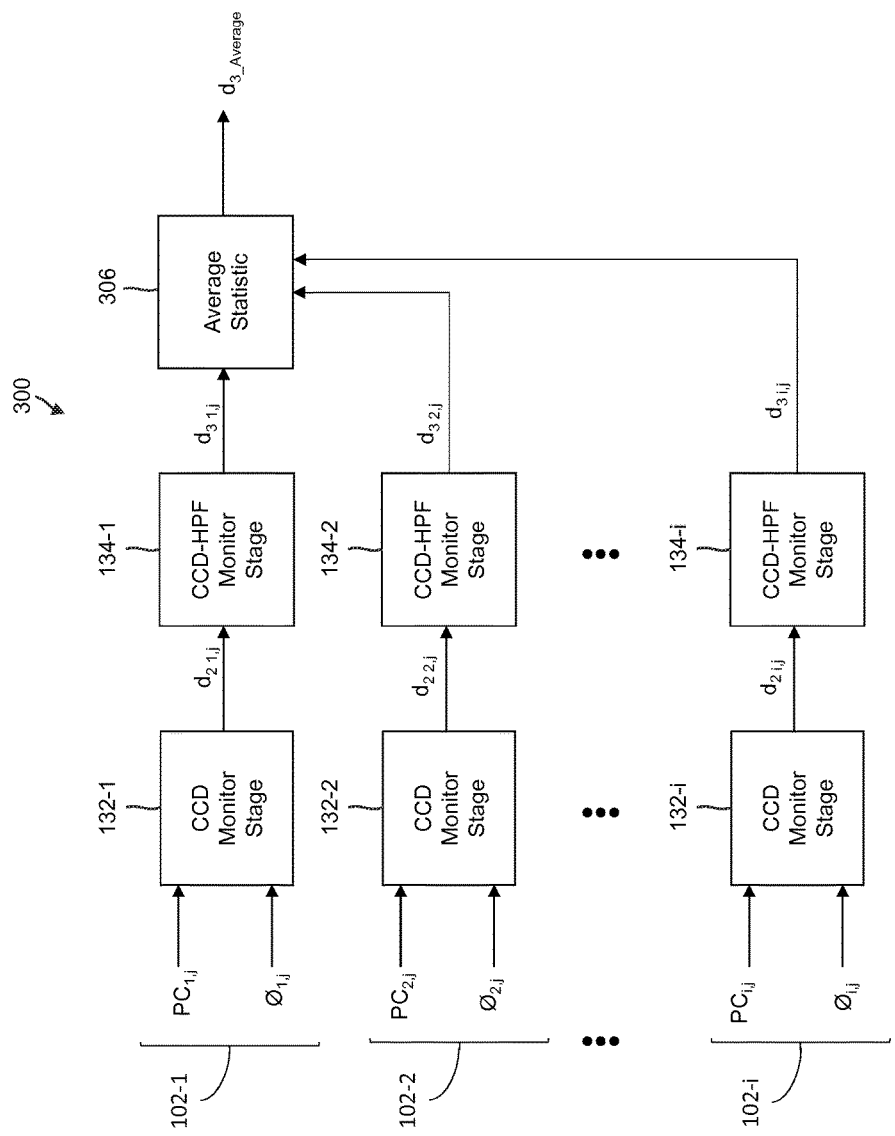
FIG. 3 is a diagram illustrating the operation of a CCD-HPF monitor of one embodiment of the present disclosure.

As illustrated by FIG. 3, separate monitor functions can be implemented for each GNSS satellite 106 being tracked by the GBAS 100 and for each reference receiver 102. For example, in FIG. 3 the raw pseudorange code and uncorrelated accumulated delta range carrier measurements are respectively received for each of reference receivers 102-1 to 102-$i$. For each of the reference receivers 102-1 to 102-$i$, the CCD monitor stage 132 (shown implemented respectively for each reference receivers as 132-1 to 132-$i$) calculates a divergence rate estimate for a Satellite (j) which is provided to the CCD-HPF monitor state 134 (shown implemented respectively for each reference receivers as 134-1 to 134-$i$). In one embodiment, the algorithms for CCD-HPF monitor 130 use tracking information from the receivers 120-1 to 120-$i$ to determine which satellites are being tracked.

Within the CCD monitory stage 132, the input to the first of two $1^{st}$ order Linear Time Invariant (LTI) filters (see Eq. 2), at each 2 Hz time epoch k, is the raw code minus ADR computed as shown below in Eq. 1.

$$z_{i,j}(k) = PR_{i,j}(k) - \phi_{i,j}(k) \quad \text{Eq. 1}$$

where $PR_{i,j}(k)$ is the raw pseudorange code measurement for satellite (j) received via reference receiver (i), and $\phi_{i,j}(k)$ is the accumulated delta range carrier measurement for satellite (j) on reference receiver (i), both typically measured in units of meters.

In one embodiment, a divergence rate estimator differentiates the input z and filters the result using two $1^{st}$ order LTI filters in series to reduce the code and carrier noise contribution to estimate error. The estimator algorithm is given in Eq. 2 and Eq. 3 below. The estimator output is the filtered divergence rate estimate $d_2$.

$$(d_1)_{i,j}(k) = \frac{\tau_{d1} - T}{\tau_{d1}} (d_1)_{i,j}(k-1) + \frac{1}{\tau_{d1}} [z_{i,j}(k) - z_{i,j}(k-1)] \quad \text{Eq. 2}$$

$$(d_2)_{i,j}(k) = \frac{\tau_{d2} - T}{\tau_{d2}} (d_2)_{i,j}(k-1) + \frac{T}{\tau_{d2}} (d_1)_{i,j}(k) \quad \text{Eq. 3}$$

where $z_{i,j}(k)$ is the Epoch's raw code minus carrier measurement for satellite (j) on reference receiver (i) (measured in meters), $(d_1)_{i,j}(k)$ is the 1st filtered divergence rate estimate for the current measurement for satellite (j) on reference receiver (i) (measured in m/s), $(d_2)_{i,j}(k)$ is the $2^{nd}$ filtered divergence rate estimate for satellite (j) on reference receiver (i) (measured in m/s), $\tau_{d1}$ is the $1^{st}$ filtered divergence rate estimate time constant (for example, 25 seconds), and $\tau_{d2}$ is the $2^{nd}$ filtered divergence rate estimate time constant (for example, 25 seconds).

In the CCD-HPF monitor stage 134, the CCD-HPF monitor discriminator divergence rate estimate is referred to as $d_3$. In one embodiment, the discriminator output from the CCD monitor stage 132, $d_2$, is filtered with a second order, high-pass Butterworth filter (with a cutoff frequency of 0.01 Hz, for example) to form the CCD HPF discriminator output $d_3$.

For one embodiment, a CCD-HPF equation for calculating $d_3$ is:

$$(d_3)_j(k) = [(b_1 \times (d_2)_j(k) + b_2 \times (d_2)_j(k-1) + b_3 \times (d_2)_j(k-2)) - (a_2 \times (d_3)_j(k-1) + a_3 \times (d_3)_j(k-2))]/a_1 \quad \text{Eq. 4}$$

where $(d_3)_{i,j}(k)$ is the $3^{rd}$ filtered divergence rate estimate for the current measurement for satellite (j) on reference receiver (i). Note that for some embodiments, the a1 constant can be left out of the equation when its value is 1. As shown in FIG. 3, a CCD HPF discriminator $d_3$ value is calculated in this manner for each of the reference receivers 102-1 to 102-$i$ with respect to a particular satellite (j). In one implementation, filter coefficients for the CCD-HPF equation may be such as shown in Table 1 below:

TABLE 1

| Filter Coefficient | Description | Value |
|---|---|---|
| $a_1$ | $2^{nd}$ Order, high-pass Butterworth Filter $a_1$ constant for 0.01 Hz cutoff frequency. | 1.0 |
| $a_2$ | $2^{nd}$ Order, high-pass Butterworth Filter $a_2$ constant for 0.01 Hz cutoff frequency. | −1.95557824 |
| $a_3$ | $2^{nd}$ Order, high-pass Butterworth Filter $a_3$ constant for 0.01 Hz cutoff frequency. | 0.95654368 |
| $b_1$ | $2^{nd}$ Order, high-pass Butterworth Filter $b_1$ constant for 0.01 Hz cutoff frequency. | 0.97803048 |
| $b_2$ | $2^{nd}$ Order, high-pass Butterworth Filter $b_2$ constant for 0.01 Hz cutoff frequency. | −1.95606096 |
| $b_3$ | $2^{nd}$ Order, high-pass Butterworth Filter $b_3$ constant for 0.01 Hz cutoff frequency. | 0.97803048 |

With the individual $d_3$ for each of reference receivers 102-1 to 102-$i$ as input, averaging statistic function 306 outputs a $d_{3\_Average}$ discriminator value. That is, an overall CCD HPF monitor 130 discriminator value, $\overline{(d_3)_j}(k)$, is then calculated, where $\overline{(d_3)_j}(k)$ is the average $3^{rd}$ filtered divergence rate estimate across all reference receivers for satellite (j). The CCD HPF monitor 130 discriminator value $\overline{(d_3)_j}(k)$ is shown as $d_{3\_Average}$ in FIGS. 3, 4 and 5.

Figure 4:
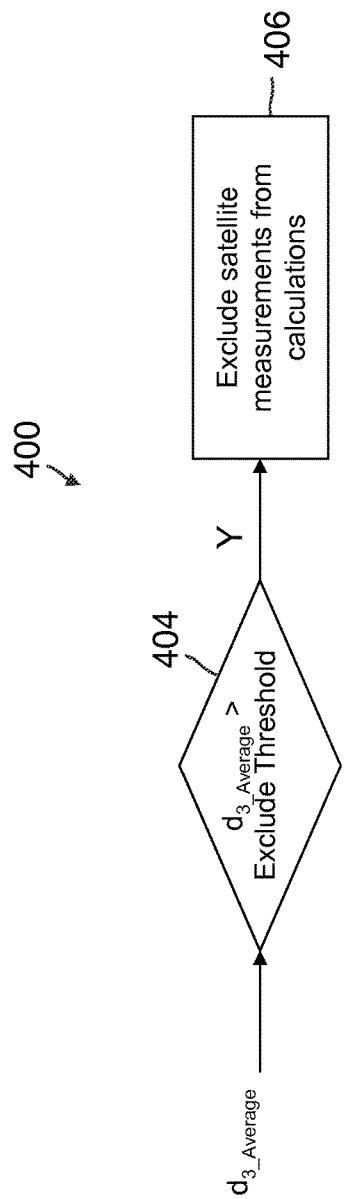
FIG. 4 is a diagram illustrating a satellite exclusion process of one embodiment of the present disclosure.

As shown in FIG. 4 generally at 400, following the $d_{3\_Average}$ discriminator calculation is the detection function shown generally at 404. Provided a value for $d_{3\_Average}$ was computed, the detection function 404 is performed on each satellite, which in some implementations is a simple threshold test such as:

if $|\overline{(d_3)_j}(k)| > Th_{HPF}(k)$ then
    $p_{HPF,j}(k) = 2$ {Exclude satellite j}
else
    $p_{HPF,j}(k) = 1$ { satellite j is normal}
end if where $p_{HPF,j}(k)$ is the Monitor Status flag for each satellite j, and $Th_{HPF}$ is the exclusion threshold. That is, the CCD-HPF monitor stage 134 will detect a transient signal deformation fault when $d_{3\_Average}$ exceeds the $Th_{HPF}$ the exclusion threshold as shown at 404. When that occurs, the process proceeds to 406 where the CCD-HPF monitor stage 134 outputs the $P_{HPF,j}$ monitor status flag that indicates when a satellite (j) should be excluded from the pseudorange correction calculation data transmitted to aircraft 104 by the GBAS 100. For some embodiments, the same monitor status flag, $p_{HPF,j}$, can also be used to indicate a satellite exclusion, as well as signal a satellite soft exclusion to the signal deformation monitor 108 (discussed below).

In some embodiments, the CCD HPF monitor 130 will also dynamically determine what detection threshold $Th_{HPF}$ should be used based on whether broadband interference (BBI) has been detected and the number of reference receivers 102 impacted. If the GBAS 100 is experiencing significant BBI, the signal deformation monitor 108 enables the possible use of an alternate detection threshold in order to maintain system integrity. For example, if any of the reference receivers 102 experiences a radio frequency interference (RFI) greater than a mask level, the CCD HPF monitor 130 will enable usage of an alternate detection threshold. However, in one implementation, signal deformation monitor 108 will not transition to using an alternate detection threshold (which preserves integrity, impacts specific continuity, maintains availability) unless three or more of the reference receivers 102 are impacted significantly.

Figure 5:
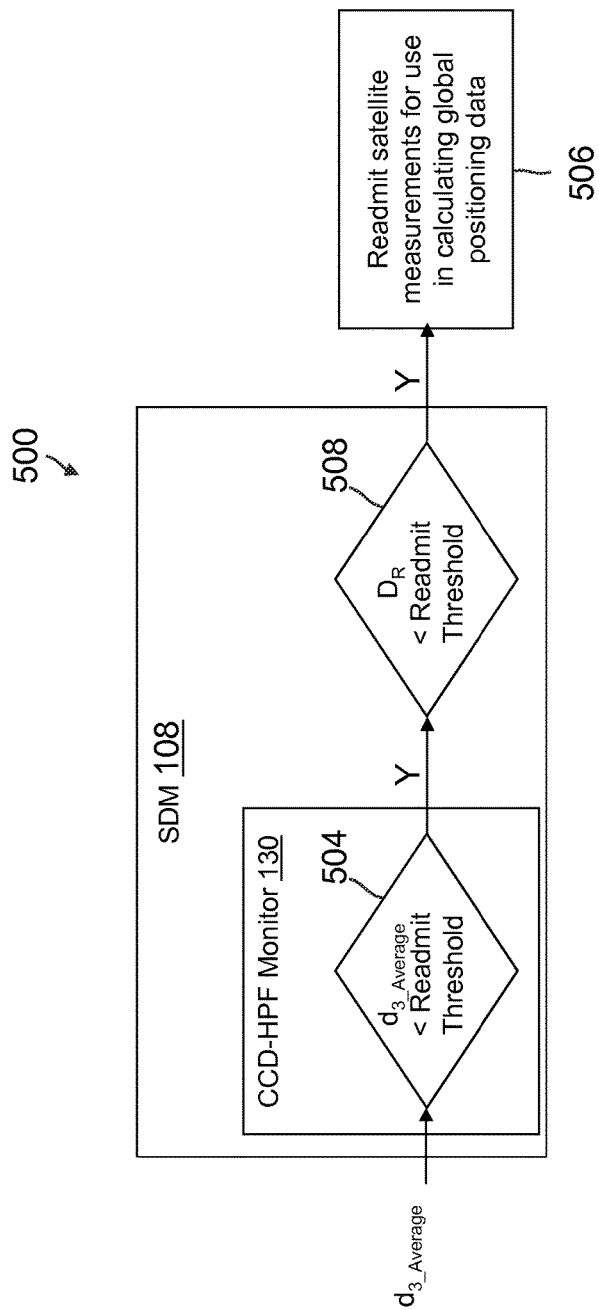
FIG. 5 is a diagram illustrating a satellite readmission process of one embodiment of the present disclosure.

The GBAS 100 does not use signals from excluded satellites when generating pseudorange corrections and navigation information transmitted to aircraft 104. FIG. 5 generally at 500 illustrates a process for readmitting an excluded satellite once the relevant fault conditions have cleared. In at least one embodiment, after measurements from a satellite have been excluded, the processing unit 204 executes readmittance instructions 240 to determine whether and when a satellite can be readmitted so that measurements from that satellite can be included in calculating the pseudorange corrections and navigation information transmitted to aircraft 104. In at least one embodiment, to readmit information from a satellite, the signal deformation monitor 108 continues to monitor the signals from the excluded satellites and compares measurements in the signals against a readmittance threshold and determines whether readmitting the signal will improve the overall performance of the GBAS 100.

Referring to FIG. 5, an excluded satellite measurement is tested for readmittance at 504 once it has been excluded for a wait time (for example, 300 seconds). When 300 seconds has elapsed, the CCD HPF monitor 130 then checks to see if the CCD-HPF monitor discriminator $d_{3\_Average}$ is less than the current selected $Th_{HPF}(k)$. If it is, the CCD HPF monitor may signal a soft exclusion to signal deformation monitor 108 (such as by setting $p_{HPF,j}=3$), else the CCD HPF monitor 130 continues to exclude the measurement and continues to check for re-admittance (such as at every 0.5 second time step, for example) until it is readmitted. Note that for re-admittance, the re-admittance threshold may be either $Th_{HPF}(k)$ or an alternate threshold value. In one embodiment, a soft exclusion signal ($p_{HPF,j}=3$) only lasts for a single sample cycle. Assuming that $d_{3\_Average}$ does not then again immediately exceed the exclusion threshold $Th_{HPF}$, then $p_{HPF,j}$ will be set to $p_{HPF,j}=1$ (i.e., normal conditions with satellite included) in the next sample. Also as shown in FIG. 5 at 508, one or more other processes can be executed by signal deformation monitor 108 which may have excluded satellite (j) based on their own respective criteria, such as discriminator DR as shown in 508. Therefore, even when CCD-HPF monitor 130 indicates that it is acceptable to readmit measurements satellite (j), signal deformation monitor 108 will verify that those other criteria satisfy their respective re-admittance thresholds before the process proceeds to 506 to readmit satellite (j) measurements for use in calculating global positioning data.

Example Embodiments

Example 1 includes a global navigation satellite system (GNSS) ground based augmentation system (GBAS), the system comprising: a plurality of global navigation satellite system (GNSS) reference receivers; a processing unit coupled to a memory unit and the plurality of GNSS reference receivers, the processing unit implementing a signal deformation monitor comprising: a Code Carrier Divergence (CCD) monitor stage; and a Code Carrier Divergence-High Pass Filer (CCD-HPF) monitor stage; wherein the CCD monitor stage inputs raw pseudorange code measurements and accumulated delta range carrier measurements from each of the plurality of GNSS reference receivers, the raw pseudorange code measurements and accumulated delta range carrier measurements associated with a navigation signal transmitted by a GNSS satellite; wherein the CCD monitor stage outputs for each of the plurality of GNSS reference receivers respective low-pass filtered divergence rate measurements, $d_2$, for the GNSS satellite; wherein the CCD-HPF monitor stage calculates for each of the plurality of GNSS reference receivers respective CCD-HPF divergence rate estimates, $d_3$, by applying a high pass filter algorithm to the respective low-pass filtered divergence rate measurements, $d_2$; an wherein the CCD-HPF monitor stage calculates an averaged CCD-HPF monitor divergence rate, $d_{3\_Average}$ from the CCD-HPF divergence rate estimates, $d_3$; wherein based on comparing the $d_{3\_Average}$ to an exclusion threshold, the signal deformation monitor outputs an exclusion signal causing the GBAS to exclude using measurements from the navigation signal transmitted by the GNSS satellite to calculate pseudorange correction information.

Example 2 includes the system of example 1, wherein the CCD-HPF monitor stage outputs a monitor status flag, $p_{HPF,j}$ associated with the GNSS satellite, wherein the signal deformation monitor outputs the exclusion signal based on the monitor status flag, $p_{HPF,j}$.

Example 3 includes the system of example 2, wherein the CCD-HPF monitor stage resets the monitor status flag, $p_{HPF,j}$ associated with the GNSS satellite to permit inclusion of the GNSS satellite when the $d_{3\_Average}$ has decreased below a re-admittance threshold.

Example 4 includes the system of any of examples 2-3, wherein the CCD-HPF monitor stage resets the monitor status flag, $p_{HPF,j}$ associated with the GNSS satellite to permit inclusion of the GNSS satellite when the $d_{3\_Average}$ has decreased below a re-admittance threshold and the GNSS satellite has been excluded for at least a predetermine wait time.

Example 5 includes the system of any of examples 1-4, wherein the exclusion threshold is dynamically determined as a function of detected broadband interference.

Example 6 includes the system of example, wherein the signal deformation monitor dynamically selects between a first exclusion threshold and a second exclusion threshold.

Example 7 includes the system of any of examples 5-6, wherein the exclusion threshold is dynamically determined as a function of a number of GNSS reference receivers impacted by the broadband interference.

Example 8 includes the system of any of examples 1-7, the CCD monitor stage comprising a plurality of linear time invariant filters, wherein the respective low-pass filtered divergence rate measurements, $d_2$ are calculated by the plurality of linear time invariant filters as a function of a difference between the raw pseudorange code measurements and accumulated delta range carrier measurements.

Example 9 includes the system of any of examples 1-8, the CCD-HPF monitor stage comprising a high-pass filter, wherein the respective low-pass filtered divergence rate measurements, $d_2$ are filtered by the high-pass filter to derive the CCD-HPF divergence rate estimates, $d_3$.

Example 10 includes the system of example 9, wherein the high-pass filter comprises a second order, high-pass Butterworth filter.

Example 11 includes the system of any of examples 9-10, wherein the high-pass filter has a cutoff frequency of 0.01 Hz.

Example 12 includes a signal deformation monitor for a Global Navigation Satellite System (GNSS) ground based augmentation station, the monitor comprising: a Code Carrier Divergence (CCD) monitor stage communicatively coupled to a plurality of GNSS reference receivers, wherein the CCD monitor stage inputs raw pseudorange code measurements and accumulated delta range carrier measurements from each of the plurality of GNSS reference receivers; and a Code Carrier Divergence -High Pass Filer (CCD- HPF) monitor stage communicatively coupled to the CCD monitor stage, wherein the CCD-HPF monitor processes each of a plurality of low-pass filtered divergence rate measurements, $d_2$ produced by the CCD monitor stage through a high-pass filter to calculate an averaged CCD-HPF monitor divergence rate, $d_{3\_Average}$; wherein the signal deformation monitor outputs an exclusion signal associated with a GNSS satellite when the averaged CCD-HPF monitor divergence rate, $d_{3\_Average}$ exceeds an exclusion threshold.

Example 13 includes the monitor of example 12, wherein the CCD-HPF monitor stage outputs a monitor status flag, $p_{HPF,j}$ associated with the GNSS satellite, wherein the signal deformation monitor outputs the exclusion signal based on the monitor status flag, $p_{HPF,j}$.

Example 13 includes the monitor of example 13, wherein the CCD-HPF monitor stage resets the monitor status flag, $p_{HPF,j}$ associated with the GNSS satellite to permit inclusion of the GNSS satellite when the $d_{3\_Average}$ has decreased below a re-admittance threshold and the GNSS satellite has been excluded for at least a predetermine wait time.

Example 15 includes the monitor of any of examples 12-14, wherein the exclusion threshold is dynamically determined as a function of detected broadband interference.

Example 16 includes the monitor of examples 15, wherein the signal deformation monitor dynamically selects between a first exclusion threshold and a second exclusion threshold.

Example 17 includes the monitor of any of examples 12-16, the CCD monitor stage comprising a plurality of linear time invariant filters, wherein the respective low-pass filtered divergence rate measurements, $d_2$ are calculated by the plurality of linear time invariant filters as a function of a difference between the raw pseudorange code measurements and accumulated delta range carrier measurements.

Example 18 includes the monitor of any of examples 12-17, the CCD-HPF monitor stage comprising a high-pass filter, wherein the respective low-pass filtered divergence rate measurements, $d_2$ are filtered by the high-pass filter to derive the CCD-HPF divergence rate estimates, $d_3$.

Example 19 includes the monitor of example 18, wherein the high-pass filter comprises a second order, high-pass Butterworth filter.

Example 20 includes the monitor of any of examples 18-19, wherein the high-pass filter has a cutoff frequency of 0.01 Hz.

In various alternative embodiments, any of the systems or methods described throughout this disclosure may be implemented on one or more computer systems comprising a processor executing code to realize the modules, functions, algorithms and other elements described with respect to FIGS. 1-5, said code stored on a non-transient data storage device. Therefore other embodiments of the present disclosure include program instructions resident on computer readable media which when implemented by such computer systems, enable them to implement the embodiments described herein. As used herein, the term "computer readable media" refers to tangible memory storage devices having non-transient physical forms. Such non-transient physical forms may include computer memory devices, such as but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device having a physical, tangible form. Program instructions include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A global navigation satellite system (GNSS) ground based augmentation system (GBAS), the system comprising:
   a plurality of global navigation satellite system (GNSS) reference receivers;
   a processing unit coupled to a memory unit and the plurality of GNSS reference receivers, the processing unit implementing a signal deformation monitor comprising:
   a Code Carrier Divergence (CCD) monitor stage; and
   a Code Carrier Divergence-High Pass Filter (CCD-HPF) monitor stage;
      wherein the CCD monitor stage inputs raw pseudorange code measurements and accumulated delta range carrier measurements from each of the plurality of GNSS reference receivers, the raw pseudorange code measurements and accumulated delta range carrier measurements associated with a navigation signal transmitted by a GNSS satellite;
      wherein the CCD monitor stage outputs for each of the plurality of GNSS reference receivers respective low-pass filtered divergence rate measurements, $d_2$, for the GNSS satellite;
      wherein the CCD-HPF monitor stage calculates for each of the plurality of GNSS reference receivers respective CCD-HPF divergence rate estimates, $d_3$, by applying a high pass filter algorithm to the respective low-pass filtered divergence rate measurements, $d_2$; and
      wherein the CCD-HPF monitor stage calculates an averaged CCD-HPF monitor divergence rate, $d_{3\_Average}$ that is averaged across the plurality of GNSS reference receivers from the CCD-HPF divergence rate estimates, $d_3$, calculated for each of the plurality of GNSS reference receivers;
   wherein based on comparing the $d_{3\_Average}$ to an exclusion threshold, the signal deformation monitor outputs an exclusion signal causing the GBAS to exclude using measurements from the navigation signal transmitted by the GNSS satellite to calculate pseudorange correction information.

2. The system of claim 1, wherein the CCD-HPF monitor stage outputs a monitor status flag, $P_{HPF,j}$ associated with the GNSS satellite, wherein the signal deformation monitor outputs the exclusion signal based on the monitor status flag, $P_{HPF,j}$.

3. The system of claim 2, wherein the CCD-HPF monitor stage resets the monitor status flag, $P_{HPF,j}$ associated with the GNSS satellite to permit inclusion of the GNSS satellite when the $d_{3\_Average}$ has decreased below a re-admittance threshold.

4. The system of claim 2, wherein the CCD-HPF monitor stage resets the monitor status flag, $P_{HPF,j}$ associated with the GNSS satellite to permit inclusion of the GNSS satellite when the $d_{3\_Average}$ has decreased below a re-admittance threshold and the GNSS satellite has been excluded for at least a predetermine wait time.

5. The system of claim 1, wherein the exclusion threshold is dynamically determined as a function of detected broadband interference.

6. The system of claim 5, wherein the signal deformation monitor dynamically selects between a first exclusion threshold and a second exclusion threshold.

7. The system of claim 5, wherein the exclusion threshold is dynamically determined as a function of a number of GNSS reference receivers impacted by the broadband interference.

8. The system of claim 1, the CCD monitor stage comprising a plurality of linear time invariant filters, wherein the respective low-pass filtered divergence rate measurements, $d_2$ are calculated by the plurality of linear time invariant filters as a function of a difference between the raw pseudorange code measurements and accumulated delta range carrier measurements.

9. The system of claim 1, the CCD-HPF monitor stage comprising a high-pass filter, wherein the respective low-pass filtered divergence rate measurements, $d_2$ are filtered by the high-pass filter to derive the CCD-HPF divergence rate estimates, $d_3$.

10. The system of claim 9, wherein the high-pass filter comprises a second order, high-pass Butterworth filter.

11. The system of claim 9, wherein the high-pass filter has a cutoff frequency of 0.01 Hz.

12. A signal deformation monitor for a Global Navigation Satellite System (GNSS) ground based augmentation station, the monitor comprising:
a Code Carrier Divergence (CCD) monitor stage communicatively coupled to a plurality of GNSS reference receivers, wherein the CCD monitor stage inputs raw pseudorange code measurements and accumulated delta range carrier measurements from each of the plurality of GNSS reference receivers; and
a Code Carrier Divergence-High Pass Filter (CCD-HPF) monitor stage communicatively coupled to the CCD monitor stage, wherein the CCD-HPF monitor processes each of a plurality of low-pass filtered divergence rate measurements, $d_2$ produced by the CCD monitor stage through a high-pass filter to calculate an averaged CCD-HPF monitor divergence rate, $d_{3\_Average}$, that is averaged across the plurality of GNSS reference receivers from CCD-HPF divergence rate estimates, $d_3$, calculated for each of the plurality of GNSS reference receivers;
wherein the CCD-HPF divergence rate estimates, $d_3$, are calculated by applying a high pass filter algorithm to the respective low-pass filtered divergence rate measurements, $d_2$;
wherein the signal deformation monitor outputs an exclusion signal associated with a GNSS satellite when the averaged CCD-HPF monitor divergence rate, $d_{3\_Average}$ exceeds an exclusion threshold.

13. The monitor of claim 12, wherein the CCD-HPF monitor stage outputs a monitor status flag, $P_{HPF,j}$ associated with the GNSS satellite, wherein the signal deformation monitor outputs the exclusion signal based on the monitor status flag, $P_{HPF,j}$.

14. The monitor of claim 13, wherein the CCD-HPF monitor stage resets the monitor status flag, $p_{HPF,j}$ associated with the GNSS satellite to permit inclusion of the GNSS satellite when the $d_{3\_Average}$ has decreased below a re-admittance threshold and the GNSS satellite has been excluded for at least a predetermine wait time.

15. The monitor of claim 12, wherein the exclusion threshold is dynamically determined as a function of detected broadband interference.

16. The monitor of claim 15, wherein the signal deformation monitor dynamically selects between a first exclusion threshold and a second exclusion threshold.

17. The monitor of claim 12, the CCD monitor stage comprising a plurality of linear time invariant filters, wherein the respective low-pass filtered divergence rate measurements, $d_2$ are calculated by the plurality of linear time invariant filters as a function of a difference between the raw pseudorange code measurements and accumulated delta range carrier measurements.

18. The monitor of claim 12, the CCD-HPF monitor stage comprising a high-pass filter, wherein the respective low-pass filtered divergence rate measurements, $d_2$ are filtered by the high-pass filter to derive the CCD-HPF divergence rate estimates, $d_3$.

19. The monitor of claim 18, wherein the high-pass filter comprises a second order, high-pass Butterworth filter.

20. The monitor of claim 18, wherein the high-pass filter has a cutoff frequency of 0.01 Hz.

* * * * *